United States Patent [19]

Nellson

[11] Patent Number: 5,793,309

[45] Date of Patent: Aug. 11, 1998

[54] SHORT RANGE ELECTROMAGNETIC PROXIMITY DETECTION

[75] Inventor: George Franklin Nellson, Coon Rapids, Minn.

[73] Assignee: Lockheed Martin Corporation, Bethesda, Md.

[21] Appl. No.: 702,411

[22] Filed: Aug. 14, 1996

[51] Int. Cl.⁶ ..................................................... B60Q 1/48
[52] U.S. Cl. ..................... 340/932.2; 340/435; 340/436; 340/903; 346/27
[58] Field of Search ..................... 340/932.2, 435, 340/436, 561, 552, 551, 554, 903; 342/27, 28, 59, 118; 361/179; 327/189; 331/76

[56] References Cited

U.S. PATENT DOCUMENTS

| | | | |
|---|---|---|---|
| 3,314,066 | 4/1967 | Schwartz et al. | 343/5 |
| 3,777,271 | 12/1973 | Telewski | 328/16 |
| 3,806,811 | 4/1974 | Thompson | 325/146 |
| 3,881,145 | 4/1975 | Tanigaki | 320/1 |
| 4,342,008 | 7/1982 | Jewett | 331/49 |
| 4,394,640 | 7/1983 | Ross | 340/23 |
| 4,623,856 | 11/1986 | Bickley et al. | 333/205 |
| 4,723,306 | 2/1988 | Fuenfgelder et al. | 455/103 |
| 5,095,312 | 3/1992 | Jehle et al. | 342/21 |
| 5,115,215 | 5/1992 | Koontz | 333/103 |
| 5,144,157 | 9/1992 | Russell et al. | 307/270 |
| 5,153,586 | 10/1992 | Fuller | 340/932.2 |
| 5,239,309 | 8/1993 | Tang et al. | 342/13 |
| 5,266,955 | 11/1993 | Izumi et al. | 342/70 |
| 5,274,271 | 12/1993 | McEwan | 307/108 |
| 5,369,373 | 11/1994 | Nelson et al. | 327/121 |

Primary Examiner—Jeffery Hofsass
Assistant Examiner—Daryl C. Pope
Attorney, Agent, or Firm—Glenn W. Bowen

[57] ABSTRACT

A very low-cost, short-range electromagnetic transceiver uses a low frequency oscillator signal as a means of charging a step recovery diode (SRD) which converts the stored charge into a very short impulse to enable very high energy efficiency frequency multiplication. This impulse is coupled to an antenna which radiates the energy and receives reflections from objects in the vicinity. The energy of the received impulse reflections in an indicator of the distance of the object to the sensor. This system may be used in a vehicle to detect obstructions in its path of motion or a parking facility where it would determine the occupancy of each vehicle parking space. In the parking facility embodiment, information is reported to a central office computer which displays spaces which are not occupied and available for assignment. This system may also be used as a proximity detector for other applications, for example, to automatically detect pedestrians approaching a traffic control signal at a street corner or to detect the proximity of any object to another.

3 Claims, 3 Drawing Sheets

SHORT RANGE ELECTROMAGNETIC PROXIMITY DETECTION

BACKGROUND OF THE INVENTION

Field of the Invention

The field of the invention is the transmission and receipt of short electrical signals for the detection of objects in a zone. More particularly, the invention is related to such a detector which has a transmitter that employs a step-recovery-diode (SRD) impulse generator and a single antenna for both the transmitter and the receiver, wherein a positive-intrinsic-negative (PIN) diode is used to control switching of the antenna. A preferred application of the invention is to detect the location of automobiles in parking stalls in a parking ramp.

DESCRIPTION OF THE BACKGROUND

The detection of the presence of a number of objects in a predefined area which are capable of reflecting electromagnetic waves has been accomplished at short ranges by devices which transmit and receive electromagnetic waves over a surface wave transmission line. Such a system is shown in U.S. Pat. No. 4,394,640, issued Jul. 19, 1983 in the name of Gerald Ross and entitled "Safe Merging System Using Short Pulse Signal Reflecting." Switches and a duplexer are used to transition between the transmission and receiving stages of the system.

A comb spectral generator is an electronic device which generates a harmonic frequency signal series for a line spectrum of frequencies that may extend well into the upper GHz ranges. Comb spectral generation may be achieved by use of a snap-back, or step-recovery-diode, (SRD) which is biased to a predetermined operating point and has an input coupled to a periodic electrical signal generator, such as a sinewave generator. The SRD is a microwave diode which has steep doping profiles and narrow junctions to maximize charge-storage effects. This leads to fast recovery of injected charge and results in a typical transition period of a few tenths of a nanosecond and the exceptionally efficient production of harmonics of the frequency of the input signal generator. Present day versions of the SRD have a relatively low breakdown voltage which limits the power capability of the diode, thus making communication systems based on the SRD ideal for limited range applications.

The use of an SRD for harmonic generation is a known technique, as shown in U.S. Pat. No. 3,777,271, issued Dec. 4, 1973, in the name of Frederick John Telewski, and entitled "Generation of Microwave Frequency Combs with Narrow Line Spacing." In the Telewski patent prior art is discussed in which a microwave comb generator is constructed by utilizing an SRD and associated circuit elements which are driven by a sinewave input generator. Such comb generators have been confined to the generation of signals that are transmitted over coaxial cables to test the cable or receivers that are coupled to the cable. The short range of electromagnetic pulses in air has generally been considered as limiting their usefulness.

In operation, SRD's are alternately forward and then reversed biased. When they are forward-biased current flows through the diode junction. When they are reversed-biased current is swept from the diode junction by minority charge carriers. This action produces a transient pulse which is very high in harmonics. An SRD produces frequency components which are integral multiples of the input signal frequency such that when these frequency components are plotted in an amplitude versus frequency plot, sharply defined lines representing these frequency components are formed.

As noted in the Telewski patent, SRD multipliers operate well above frequencies above 10 MHz, although signal strength in general decreases with increasing harmonic frequency order and becomes too low to be useful at about 150–200 lines. It is also noted that the minimum obtainable comb line spacing is about one-half to one percent of the frequency of the uppermost useful comb line.

The Telewski patent describes a device in which the conventional comb SRD generator is driven simultaneously by two or more signals of different frequencies to produce two or more different combs with line spacings that correspond to the respective drive signal frequencies. Since the comb generator is inherently a non-linear device, it produces the intermodulation products of the different combs which results in a composite comb that consists of lines that are spaced by the difference between the frequencies of the two driving signals.

Step-recovery diodes, or impulse train generators, are available from Hewlett Packard which may be driven at various drive frequencies of 100, 250, 500 and 1000 MHz. These impulse train generators generate useful power at harmonics through 18 GHz. Some types of SRD's require an external bias, but the Hewlett Packard models designated by them as 33002A/B, 33003A/B, 33004A/B and 33005C/D are self-biased. Either an externally biased SRD or a self-biased SRD may be employed in the present invention.

U.S. Pat. No. 3,806,811 entitled "Multiple Carrier Phase Modulated Signal Generating Apparatus," issued Apr. 23, 1974 to Wallace T. Thompson, employs an SRD in which a "pump" signal is phase-modulated and is used to drive the SRD so that all of the spectral lines of the comb have the same modulation on them. The addition of phase-modulation of the SRD is a feature which may be incorporated into the present invention for various applications, if desired.

High speed switches are also required in the present invention. One type of suitable switch is the "positive-intrinsic-negative diode" or PIN diode. These devices have a region of intrinsic semiconductor material (equal hole and election charge carriers) intermediate P-type and N-type regions. When forward bias is applied across the intrinsic region, the diode resistance drops very fast allowing PIN diodes to be used as high speed switches. Through the application of appropriate voltages, these diodes may be made to conduct or inhibit the conduction of r.f. signals. PIN switches have a number of desirable features, including that they are broadband devices that are fast switching and have high isolation and ultra-low power consumption. Consequently, they have been used in a number of applications where advantage may be taken of these characteristics.

Other types of high speed switches that may be employed in the invention are Field Effect Transistor (FET) switches, particularly Gallium Arsenide switches.

PIN diodes are also useful in the present invention to provide, if desired, amplitude-limiting and phase-modulation of the comb lines.

U.S. Pat. No. 4,623,856, entitled "Incrementally Tuned R. F. Filter Having PIN Diode Switched Lines," issued Nov. 18, 1986 to Robert H. Bickley, at al., describes an r.f. filter in which the filter frequency is adjusted using PIN diodes.

U.S. Pat. No. 4,723,306, issued Feb. 2, 1988, entitled "Wide Band Transmitter for Short Electro-Magnetic Waves," issued in the name of Helmut Fuenfgelder, et al., describes a transmitter in which PIN diodes are used as electronic switches.

U.S. Pat. No. 4,342,008, entitled "Switched Tunable Frequency Multiplier," issued Jul. 27, 1982, in the name of Robert E. Hewitt, describes the use of a PIN diode for connecting the output coupling loop to a YIG tuned frequency multiplier-to-ground.

U.S. Pat. No. 5,115,215, entitled "PIN Diode Activation Method and Apparatus," issued May 19, 1992, to Floyd A. Koontz, shows a device in which PIN diodes can be selectively made conductive to shunt the input terminals of a device so that the device is thereby effectively bypassed.

U.S. Pat. No. 5,369,373, issued Nov. 29, 1994, entitled "Comb Data Generation" in the names of George F. Nelson and David P. Andersen, and now assigned to the assignor of the present invention, shows a comb data generator and transmitter which utilizes a step recovery diode (SRD) for comb data generator and a PIN diode for signal limiting.

PIN diode fast-switching switches are commercially available. They may be provided also by over-driving variable gain, wideband amplifiers that utilize PIN diodes. Representative amplifiers of this type are sold by Hewlett Packard under the designations HAMP 4001/4002.

SUMMARY OF THE INVENTION

A system having one or more transceivers is used for short range electromagnetic proximity detection of objects in one or more areas by associating at least one transceiver with each area. Each of the transceivers has:

(a) a comb signal generator that generates line spectrum electromagnetic signals in a sequence of groups;

(b) an antenna coupled to said comb signal generator which transmits the electromagnetic signals and receives at least a portion of the electromagnetic signals which are reflected from an object;

(c) a receiver coupled to said antenna means for receiving the line spectrum electromagnetic signals from the antenna; and (d) a timer coupled to said comb signal generator and to the receiver means which determines the proximity distance of an object which reflects the transmitted electromagnetic signals by establishing the time that has elapsed between the transmission of one group of electromagnetic signals and the return of reflected electromagnetic signals from that same group of said electromagnetic signals to the antenna by initiating a timing action when that group of electromagnetic signals is transmitted from the antenna, and by terminating the timing action when that group of electromagnetic signals is received by the antenna.

An excitation source may be integral to each transceiver or may be coupled to each of the comb generators to supply a periodic excitation signal. If a shared excitation source is employed, the receiver of each of the transceivers identifies itself.

BRIEF DESCRIPTION OF THE DRAWINGS

The present invention is described by reference to the drawings in which.

DETAILED DESCRIPTION OF THE PREFERRED EMBODIMENT

Figure 1:
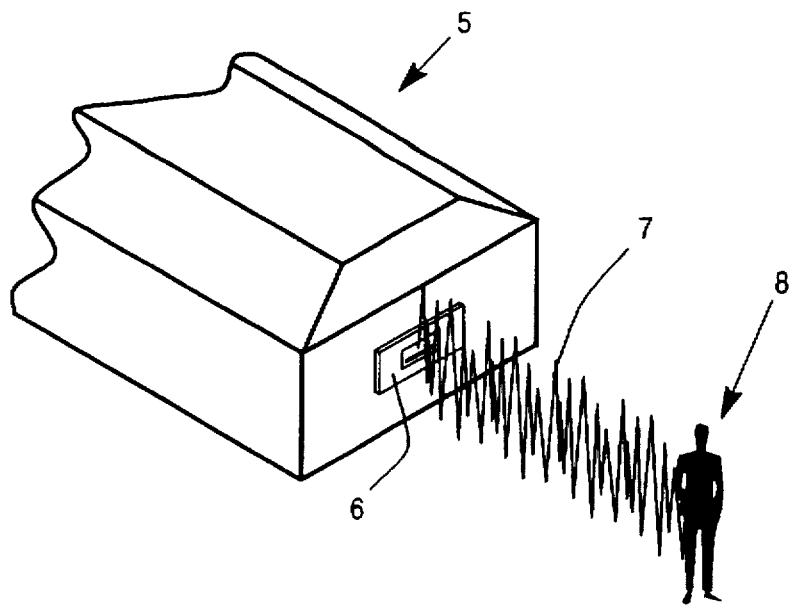
FIG. 1 is a perspective partial view of an automobile which uses a transceiver which may be mounted on a vehicle to implement the invention.

This invention involves the transmission and receipt of electromagnetic waves for short range proximity detection. The transmitter portion of the invention utilizes the comb generator capabilities of an SRD to generate pulsed r.f. signals in response to a very low frequency excitations signal. The excitations signal may be sinusoidal or, for example, a frequency of 1 MHz or greater. The sinusoidal excitation signal is used as a forward bias and produces a current through the SRD. During one-half of the cycle of the sinusoidal excitations signal, the forward current through the SRD is used to produce a stored charge. During the second half-cycle of the excitation signal, the SRD junction is reversed biased. As the reverse bias is applied, the junction current stops flowing and the junction Is reversed biased. In this portion cycle the minority charge carriers in the junction suddenly sweep out the stored charge and produce a picoseconds impulse. This impulse is composed of an extremely large number of harmonics of the original excitation signal frequency, which in the frequency domain looks like a comb with many harmonics of the input excitation signal which extend over many GHz of the spectrum.

Any of the harmonic frequencies can be selected by an r.f. filter and used as an r.f. source with repetition rate controlled by the lower input frequency. Output harmonics up to and beyond 18 GHz and output r.f. powers up to 10 Watts are available. Different circuit approaches may be used, for example, series or shunt, depending on which is the simplest to implement in the circuit board for activating the SRD. A series implementation couples the pump frequency into the SRD through a capacitor. The SRD d.c. bias circuit comprised of an isolation resistor (approximately 100 to 1000 Ohms) connected to the SRD in parallel with the pump frequency isolation capacitor. Bias current flows through the SRD to a termination resistor of 50 Ohms. An L-section filter provides a high-pass function out of the SRD to the antenna. This high-pass filter permits SRD generated very high frequencies (impulses) to couple to the antenna while reflecting the pump frequency back into the SRD. Suitable decoupling (bypass) capacitors will be used in the circuit to the bias power supply.

The oscillator may be a sinewave or square-wave or pulse, generator. Each of these produce an acceptable pump energy for the impulse generation circuit of this sensor. The choice of pump and impulse frequencies are determined by the characteristics of the SRD. The transition time ($t_t$) of the SRD is the reciprocal of the highest impulse frequency limit for a given diode. For example, the Hewlett Packard SRD Model 5082-0180 has a transition time of 225 pico-seconds ($225.10^{-12}$ seconds), or at a 4.444 GHz maximum sinusoidal frequency for efficient operation. The Minority Carrier Lifetime ($\tau$) of the SRD establishes the lowest pump frequency for efficient operation. For example, $\tau = 1/100_{ns}$ or 10 MHz.

The invention may be incorporated into any type of moving vehicle or device to enable the operator or a computer to detect the presence of a person, an animal or an object in the proximity of the vehicle or device. FIG. 1 shows the implementation of the invention in which a transceiver 5 may be mounted on an automobile, or other vehicle, to detect if any pedestrian or object is in the path of the car when it is being backed up. The proximity detection transceiver 12 may be mounted in the trunk of the car to enable the generated pulses to be transmitted from this area by an antenna 6. If a person or object 8 intercepts the transmitted electromagnetic wave pulses 7, they will be reflected back to the antenna 6 to enable the transceiver to signal that the path of the car is obstructed.

Figure 2:
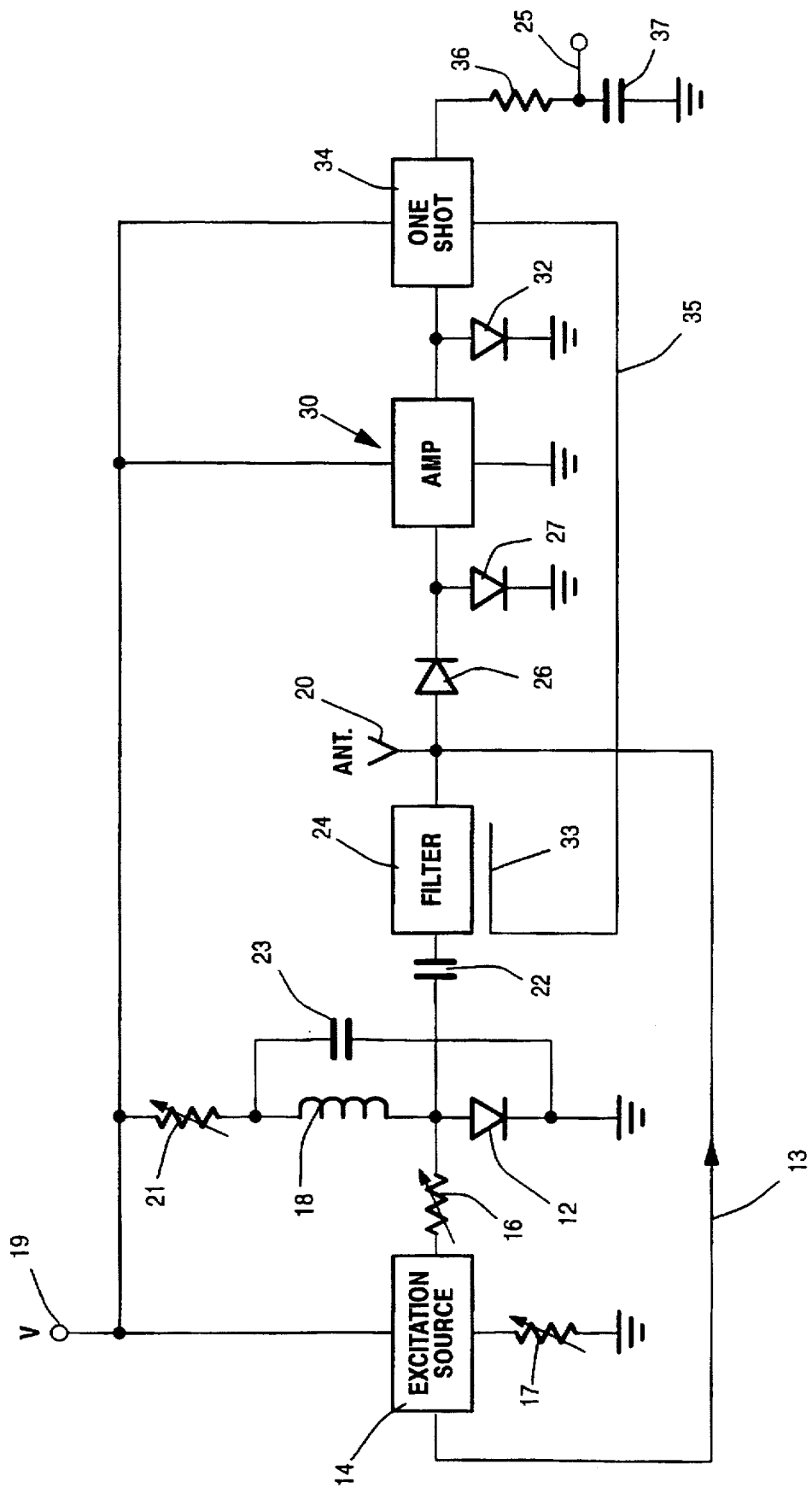
FIG. 2 is a schematic diagram of a transceiver constructed in accordance with the present invention.

A schematic drawing of the transceiver 5 of the present invention is shown in FIG. 2. The SRD diode 12 is coupled to the excitation source 14, which may be provided by a number of sources, including crystal controlled stable oscillators, integrated circuit function generators and Voltage Controlled Oscillators (VCO's). The magnitude of the output of the excitation source may be controlled by the variable resistor 17. The excitation source 14 is powered by the voltage V at the terminal 19, which is also coupled to other components of the circuit. The variable resistor 21 is coupled between the voltage terminal and the choke 18 and the capacitor 23. The capacitor 23, which is coupled across the choke 18, is used to adjust the d.c. bias applied to the SRD to optimize the comb generation efficiency for the amplitude of the drive voltage from the excitation source 14.

A radio frequency choke 18 is coupled to the anode of the SRD so that high frequency signals generated by the SRD will be reflected back to the SRD thereby increasing its efficiency. An example of the power efficiency of a typical SRD can be estimated. With an input power of 500 milli-Watts at 100 MHz repetition frequency, the output power is at least 1 milliwatt at all harmonics to 2.5 GHz. This means that for 500 mW of input power at 100 MHz, 1 mW of output power is available at the 1 GHz frequency where 1 GHz is an arbitrary choice of a harmonic frequency. The d.c. power supply voltage and return signal is provided on a suitable r.f. cable, such as coaxial cable, or a twisted pair on which the system receives 100 MHz input pulses on.

The impulse from the SRD 12 is coupled to the antenna 20 through a capacitor 22 and a stripline filter 24. This provides isolation of the DC bias for the SRD 12 from the antenna. The stripline filter further may be etched in the printed circuit card that carries the other components of the transceiver. It acts as a harmonic filter and selects the particular frequency of transmission. The output is represented by a short r.f. pulse which is a harmonic of the input excitation signal and is in the GHz range. This short pulse is propagated normal to the circuit and through space until it is dissipated or reflected from a target back into the antenna.

Suitable fast-switching selection switches 26,27, which preferably are positive-intrinsic-negative PIN diodes or FET diodes, are coupled between the antenna and the input of the amplifier section 30 and between the input of the amplifier section 30 and ground, respectively. PIN diodes or "positive-intrinsic-negative" diodes have a region of intrinsic semiconductor material (equal hole and election charge carriers) intermediate P-type and N-type regions. When a forward bias is applied across the intrinsic region, the diode resistance drops across the intrinsic region, the diode resistance drops very fast allowing PIN diodes to be used as high speed switches. Through the application of appropriate voltages, these diodes may be made to conduct or inhibit the conduction of r.f. signals. PIN switches have a number of desirable features, including that they are broadband devices that are fast switching and have high isolation and ultra-low power consumption. Consequently, they have been used in a number of applications where advantage may be taken of these characteristics.

The PIN switches 26 and 27 carry a DC bias circuit which is supplied from excitation source 14. The excitation source provides a turn-off d.c. bias to the PIN switches 26, 27 on the line 13 to effectively isolate the receiver from the transmit energy during the transmit impulse. The SRD 12 when in its "off" condition between impulses presents a forward drop of approximately 0.5 volts for isolation of the impulse transmitter from the received signal from the object being detected. With this isolation and the diode switches 26, 27, no significant transmit energy will enter the receiver and thus no recovery time problems are experienced from saturation of the receiver.

The receiver portion of the invention is shown at the right-hand side of FIG. 2. The antenna 20 is used for both transmission and reception of the electromagnetic signal. The antenna 20 is coupled to the input of the first of the amplifiers 30. The output of the last of these amplifiers is connected to a zero-bias Schottky diode 32. The Schottky diode detects the reflected r.f. pulse from a target which results in a baseband pulse. The estimated return signal into the diode is 10 micro-Watts. With a voltage sensitivity of 8 mV per micro-Watt, and a 50% efficiency at 1 GHz, it is expected that the resulting signal voltage from the diode will be 40 mV. to convert this to a logic signal, it is necessary to amplify by approximately 100 times through the amplifier 30. At this point the reflected impulse from the object being detected has been reconstructed and detected to a pulse whose position in time corresponds to its distance from the antenna 20.

A binary one-shot 34 has one input coupled to the output of the amplifier section 30 and the Schottky diode 32. Another input of the one-shot 34 is coupled to the stripline filter 24 on the line 35 which is coupled to the filter by a directional coupler 33, or signal sampler. This coupler samples the transmit pulse and starts the one-shot pulse running. The coupler samples the signal by a printed circuit line being in proximity to a printed circuit line carrying the transmit pulse current. Some small amount of energy from the transmit line is induced into the sampling line. This provides a reference "start pulse" signal to the one-shot. A transmit pulse drives the flip-flop into a first state until the detected pulse from the receiver section triggers it to the opposite state. This generates a pulse whose width corresponds to the distance to the object from the transmit/receive antenna. This pulse occurs once every cycle of the 10 MHz pump frequency and continues until it is shut off due to the reflected electromagnetic impulse.

The pulse from the one-shot 34 is integrated in a resistor 36 and capacitor 37 RC combination to produce a d.c. voltage on the output line 25 whose amplitude is a function of the detected object's distance from the antenna. A threshold detector (not shown) may be coupled to the output line 25 to determine when the distance of the detected object corresponds to one or more preset voltage amplitudes, each of which may represent a unique distance from the antenna and each of which can be used to control some warning function.

Figure 3:
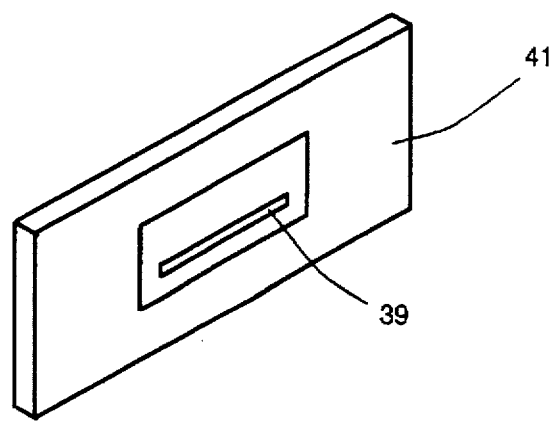
FIG. 3 is a perspective partial view of a wall in a parking automobile ramp which includes a transceiver, as shown in FIG. 2.
Figure 4:
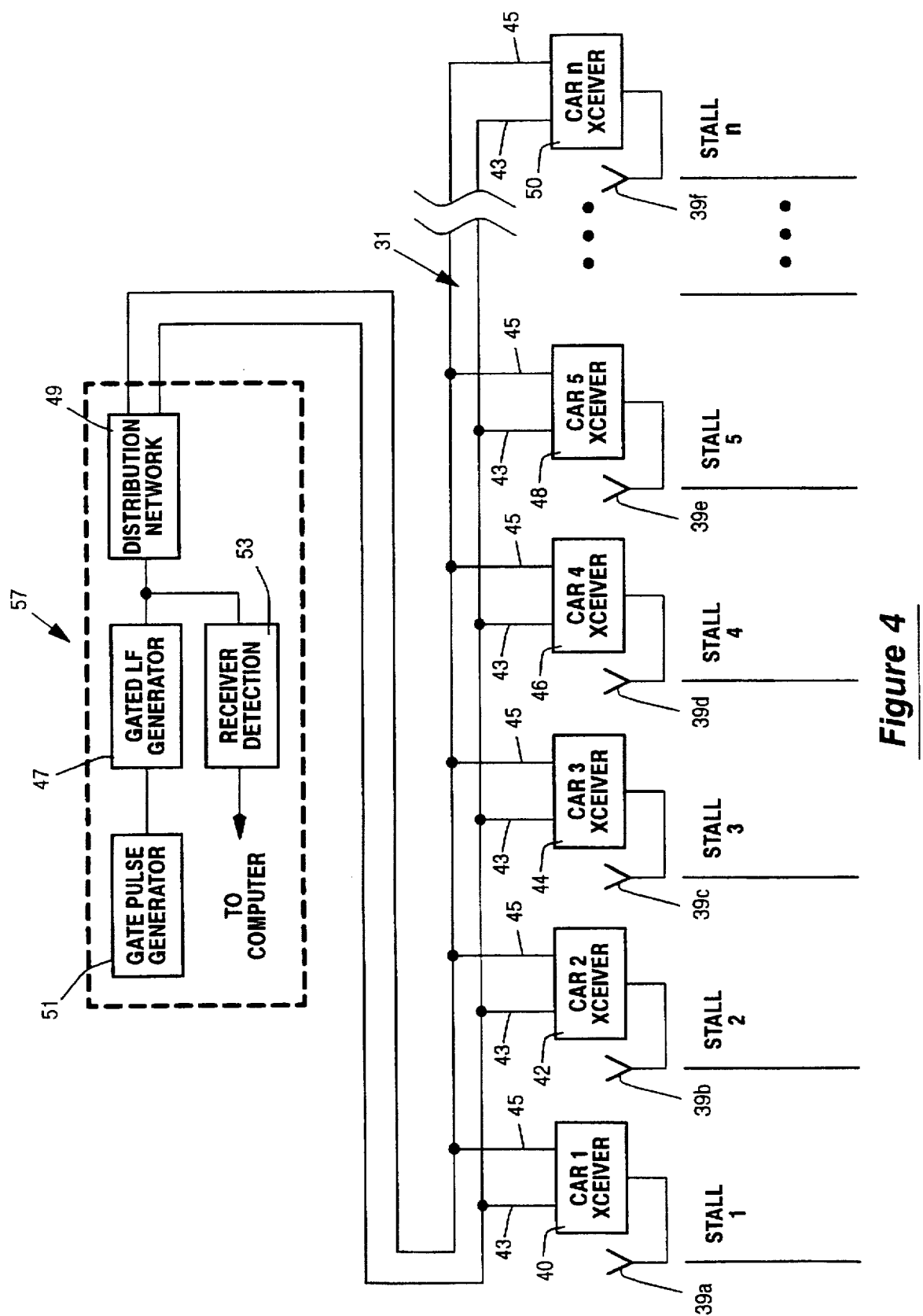
FIG. 4 is an illustration of a parking ramp implementation that employs the wall transceivers of FIG. 2 in a parking ramp to detect the presence or absence of automobiles in parking stalls.

One application of the present invention is monitoring and improving the efficiency of congested automobile parking facilities whereby cars can be accommodated more efficiently within the facility so that lost time due to driving around looking for an empty stall can be minimized. It also permits management personnel to fill a parking slot as soon as it is available. The location of empty stalls may be displayed and cars may be directed to a specific stall within the facility. A separate transceiver may be associated with each stall of the parking ramp. FIG. 3 shows one of the printed circuit patch transmitting and receiving antennas 20 which are located in the wall 41 of each parking stall for this embodiment. In the parking facility embodiment, a low frequency (LF) sinewave generator, for example, 100 MHz, may be used to supply the junction charging current of the SRD of a transmitter in each parking stall, as shown in FIG. 4. The transceivers 40–50 of FIG. 4 represent transceivers in each of n parking stalls.

Each cycle of the LF generator produces a pulsed r.f. output from the SRD of each transmitter portion of the transceivers when the junction becomes reversed biased by the sinewave from the LF generator. The pulsed r.f. signal is transmitted by radiating antenna outward and towards the position which a vehicle would occupy if it were in the parking slot. The r.f. energy pulse will reflect off a vehicle in the stall and return to the antenna. While pulses are received back, it is known that a vehicle occupies the parking slot. If no reflected signal is detected it is known that no vehicle occupies the parking slot.

The presence or absence of a car is determined by time division multiplexing along the two wire bus 31. This is controlled by the 100 MHz gate pulse generator 51. 100 MHz allows time division multiplexing resolution of 3 meters, (approximately one car space), 3 meter resolution is for 1 wavelength, while a ½ wavelength is minimum requirement. The detection pulse is sent back to the distribution network 49 on the shielded coax or twisted pair bus 31. Power is also supplied on the bus 31. The return impulse may be of an arbitrary length, determined by the width and number of parking stalls. The one-shot 34 produces an output of a relatively long duration relative to the pulse received narrow input impulse. This pulse width is long enough to be a relatively low frequency pulse, and it will propagate back to the controller with minimal losses over inexpensive cable. If the original receiver impulse were propagated back to the controller, the bus would have to be capable of handling nano-second wide pulses of an extremely high bandwidth with little degradation. However, this would require expensive cables.

The transceiver may be located on a wall, adjacent which a car will be parked, or, if the cars are in an open space but under a roof, then the transceiver may be mounted on the ceiling. The usable range is about 5 to 10 feet. The master distribution network 57, (or networks if more than one is used), is wired to a central computer at the parking facility office (not shown), which has a display that may be viewed by an operator. The distribution network may be placed in positions which permit all of the required stalls to be monitored. The number of networks to be used will be determined by the propagation of the timing or clocking pulses from the LF generator 47 through the network 49. The gated LF generator 47 of the embodiment of FIG. 4 replaces the excitation source 14 of the individual unit transceiver of FIG. 2, and is coupled to the transmitter portions of the transceivers over the lines 43. The distribution network is connected to the receiver portions of the transceivers over the lines 45. The low frequency (LF) (i.e., low frequency relative to the radiated frequency) generator 47 is a pulse or sinewave generator that functions as a clock for the system. The LF generator preferably produces a pulse, although it could be a recycle of a sine-wave at a frequency of approximately 100 Mhz, so the propagation time of a single event (pulse or sinewave) is no longer than a standard car stall width to obtain the proper individual stall resolution. In addition, the Minority Carrier Lifetime determines the minimum frequency of this LF generator for proper operation of the SRD.

The LF generator or clock is pulsed or gated at intervals by the gate pulse generator which permits one event to propagate the full length of the series of parking stalls and to be transmitted on antennas $39_a$–$39_r$ and for the reflections corresponding to cars to return to the clock and receiver electronics through the antennas $39_a$–$39_r$. The receiver gating and detection circuit 53 supplies the individual return signals in the transceivers 40–50 to the central computer (not shown) in order to determine which parking stalls are filled and not filled, so that no unnecessary degradation will occur due to long cable path losses to the transceivers 40–50.

The computer may provide statistical information on each parking space, such as the time of occupancy, the time of departure, the average duration of a stay, etc. In addition, each stall of the facility may use the wiring bus to incorporate emergency buttons which automatically make a call for assistance and inform law enforcement personnel where in the facility to respond.

The choice of the lowest possible frequency for the LF generator is determined by the width of a typical parking stall (about 3 meters), and the time required for the sinewave to propagate through the cable to the next stall. This requires at least 83 MHz for the LF generator frequency. Each of the stall transducers is wired in parallel to the same cable from the LF generator. The addressing of a particular stall is determined by the delay time from the LF generator corresponding to the propagation time to that stall after the beginning of the LF cycle. If a car is parked in every stall, pulses would be received at the LF generator source every 12 nsec, a non-return-to-zero (NRZ) approach for the pulses. That means that if every stall is occupied, the returning pulses would produce a high level continuously and only drop to zero if a parking stall was empty. This produces a very low data rate when the most critical evaluation of the facilities is necessary and the computer control does not have to process data for parking slots which are already filled.

What is claimed is:

1. A transceiver for short range electromagnetic proximity detection comprising, comb signal generating means for generating line spectrum electromagnetic signals in a sequence of groups of said signals, excitation source means coupled to said comb generating means for supplying a periodic excitation signal to said comb generating means, antenna means coupled to said comb signal generating means for transmitting said electromagnetic signals, said antenna means also being capable of receiving at least a portion of said electromagnetic signals which are reflected from an object after said electromagnetic signals have been transmitted from said antenna means, receiving means coupled to said antenna means for receiving said line spectrum electromagnetic signals from said antenna means, and timing means coupled to said comb signal generating means and to said receiving means which determines the proximity distance of an object which reflects said electromagnetic signals that have been transmitted from said antenna means for establishing the time that has elapsed between the transmission of one of said groups of said electromagnetic signals and the return of reflected electromagnetic signals from said one group of said electromagnetic signals to said antenna means by initiating a timing action when said one group of said electromagnetic signals is transmitted from said antenna means, and by terminating said timing action when said one group of said electromagnetic signals is received by said antenna means wherein:

said antenna means comprises a single antenna, said comb generating means comprises step recovery diode means for generating said line spectrum electromagnetic signals, and wherein said transceiver comprises:

filter means coupled between said antenna means and said step recovery diode means for providing electrical isolation of said step recovery diode means and said antenna means, and said timing means comprises pulse providing means coupled to said filter means for initiating a pulse upon the initial transmission of said line spectrum electromagnetic signals from said comb generating means and to said receiver means for terminating said pulse upon the receipt of reflected signals from an object in the path of said initial transmission of said line spectrum electromagnetic signals, wherein said receiver means comprises:

PIN diode means coupled to said antenna means for isolating said antenna from said receiver means, amplifier means coupled to said PIN diode means for amplifying reflected received signals, Schottky diode means coupled to the output of said amplifier means and to said pulse producing means for detecting the reflected received signals, and threshold means coupled to said pulse producing means for determining the distance of said transceiver to an object that reflects said electromagnetic signals.

2. A system comprising a plurality of transceivers for short range electromagnetic proximity detection in a plurality of areas in which at least one transceiver is located to be associated with each area, and wherein each transceiver comprises:

comb signal generating means for generating line spectrum electromagnetic signals in a sequence of groups of said signals, antenna means coupled to said comb signal generating means for transmitting said electromagnetic signals, said antenna means also being capable of receiving at least a portion of said electromagnetic signals which are reflected from an object after said electromagnetic signals have been transmitted from said antenna means, receiving means coupled to said antenna means for receiving said line spectrum electromagnetic signals from said antenna means, and timing means coupled to said comb signal generating means and to said receiving means which determines the proximity distance of an object which reflects said electromagnetic signals that have been transmitted from said antenna means for establishing the time that has elapsed between the transmission of one of said groups of said electromagnetic signals and the return of reflected electromagnetic signals from said one group of said electromagnetic signals to said antenna means by initiating a timing action when said one group of said electromagnetic signals is transmitted from said antenna means, and by terminating said timing action when said one group of said electromagnetic signals is received by said antenna means, and said system comprises distribution means which comprises:

excitation source means which is coupled to each of said comb generating means of said plurality of transceivers for supplying a periodic excitation signal to said comb generating means, and receiver identification means coupled to each of said receiver means of said plurality of transceivers for identifying which of said areas contain detected objects wherein each of said transceivers is constructed so that said antenna means comprises a single antenna, said comb signal generating means comprises step recovery diode means for generating said line spectrum electromagnetic signals, and said transceiver comprises:

filter means coupled between said antenna means and said step recovery diode means for providing electrical isolation of said step recovery diode means and said antenna means, and said timing means comprises pulse providing means coupled to said filter means for initiating a pulse upon the initial transmission of said line spectrum electromagnetic signals from said comb generating means and to said receiver means for terminating said pulse upon the receipt of reflected signals from an object in the path of said initial transmission of said line spectrum electromagnetic signals wherein each of said transceivers is constructed so that said receiver means comprises:

PIN diode means coupled to said antenna means for isolating said antenna from said receiver means, amplifier means coupled to said PIN diode means for isolating said antenna from said receiver means, amplifier means coupled to said PIN diode means for amplifying reflected received signals, Schottky diode means coupled to the output of said amplifier means and to said pulse producing means for detecting the reflected receive signal, and threshold means coupled to said pulse producing means and to said receiver identification means for sensing the distance of each of said transceivers to an object that reflects said electromagnetic signals in the area associated with said transceivers.

3. A system as claimed in claim 2 wherein said areas are used for parking stalls for vehicles, said objects are vehicles, and all of said transceivers are coupled to said distribution means over a bus means that interconnects said comb signal generating means to said excitation source means in said distribution means, and said receiver means to said receiver identification means in said distribution means.

* * * * *

UNITED STATES PATENT AND TRADEMARK OFFICE
CERTIFICATE OF CORRECTION

PATENT NO.   : 5,793,309
DATED        : August 11, 1998
INVENTOR(S)  : George Franklin Nelson It is certified that error appears in the above-indentified patent and that said Letters Patent is hereby corrected as shown below:

Title page, item [19] and [75], "Nellson" should be changed to --Nelson--.

Signed and Sealed this

Twenty-fourth Day of November, 1998

Attest:

BRUCE LEHMAN

*Attesting Officer*     *Commissioner of Patents and Trademarks*